United States Patent [19]

Moroto et al.

[11] Patent Number: 5,269,204
[45] Date of Patent: Dec. 14, 1993

[54] HYDRAULIC CONTROL SYSTEM FOR VEHICULAR AUTOMATIC TRANSMISSION

[75] Inventors: Shuzo Moroto, Nagoya; Shiro Sakakibara; Takeshi Inuzuka, both of Anjo; Hironari Fukatsu, Tokyo; Norio Imai, Sapporo, all of Japan

[73] Assignee: Aisin Aw Co., Ltd., Japan

[21] Appl. No.: 929,570

[22] Filed: Aug. 17, 1992

[30] Foreign Application Priority Data

Aug. 16, 1991 [JP] Japan .................. 3-229669

[51] Int. Cl.$^5$ .................. B60K 41/06
[52] U.S. Cl. .................. 74/867; 74/866
[58] Field of Search .................. 74/866, 867

[56] References Cited

U.S. PATENT DOCUMENTS

| 4,631,982 | 12/1986 | Miki et al. | 74/866 X |
| 4,727,773 | 3/1988 | Sumiya et al. | 74/867 O |
| 4,727,774 | 3/1988 | Sumiya et al. | 74/867 O |
| 4,987,792 | 1/1991 | Mueller | 74/473 |
| 5,050,459 | 9/1991 | Ishikawa et al. | 74/867 O |

FOREIGN PATENT DOCUMENTS 61-157855 7/1986 Japan .

Primary Examiner—Leslie A. Braun
Assistant Examiner—Daniel Wittels
Attorney, Agent, or Firm—Lorusso & Loud

[57] ABSTRACT

A hydraulic control system for a vehicular automatic transmission includes a first servomotor, actuated by hydraulic pressure from a hydraulic pressure source, for engaging or releasing frictional engagement elements of the transmission; a second servomotor, actuated by the hydraulic pressure, for applying an engine brake; a manual valve and a shift valve, both connected between the hydraulic pressure source and the first and second servomotors, for controlling the hydraulic pressure; a cut-off valve interposed in a line extending between the manual valve and the shift valve; a solenoid valve for controlling the cut-off valve; and an electronic controller for receiving as inputs vehicular running conditions and a gear-shift mode and for outputting solenoid signals to control the shift valve and the cut-off valve responsive to the inputs. The controller outputs a solenoid signal to the cut-off valve to control communication between the manual valve and the shift valve through the line.

1 Claim, 9 Drawing Sheets

| POSITION | | | SOLENOID | | | CLUTCH | | | BRAKE | | | |
|---|---|---|---|---|---|---|---|---|---|---|---|---|
| | | | No.1 | No.2 | No.3 | C-1 | C-2 | C-0 | B-1 | B-2 | B-3 | B-0 |
| D | AUTO | 1ST | ○ | × | × | ○ | × | ○ | × | × | × | × |
| | | 2ND | ○ | ○ | × | ○ | × | ○ | × | ○ | × | × |
| | | 3RD | × | ○ | × | ○ | ○ | ○ | × | ○ | × | × |
| | | 4TH | × | × | × | ○ | ○ | × | × | ○ | × | ○ |
| | MAN | 1ST | ○ | × | ○ | ○ | × | ○ | × | × | ○ | × |
| | | 2ND | ○ | ○ | ○ | ○ | × | ○ | ○ | ○ | × | × |
| S | | 1ST | ○ | × | × | ○ | × | ○ | × | × | × | × |
| | | 2ND | ○ | ○ | ○ | ○ | × | ○ | ○ | ○ | × | × |
| | | 3RD | × | ○ | × | ○ | ○ | ○ | × | ○ | × | × |
| L | | 1ST | ○ | × | ○ | ○ | × | ○ | × | × | ○ | × |
| | | 2ND | ○ | ○ | ○ | ○ | × | ○ | ○ | ○ | × | × |
| | | (1ST) | × | × | × | ○ | × | ○ | × | × | ○ | × |
| REMARKS | | | ○ ON | | | ENGAGEMENT | | | | | | |
| | | | × OFF | | | RELEASE | | | | | | |

FIG. 3

HYDRAULIC CONTROL SYSTEM FOR VEHICULAR AUTOMATIC TRANSMISSION

BACKGROUND OF THE INVENTION

1. Field of the Invention

The present invention relates to a vehicular automatic transmission, and especially to a hydraulic control system for permitting manual shifting of the transmission.

2. Description of the Prior Art

In a conventional vehicular automatic transmission, hydraulic pressure is supplied from a hydraulic pressure source of a hydraulic control system and is then regulated. A shift lever is operated to move a manual valve so that the thus-regulated hydraulic pressure is relayed to one of several shift valves. The thus selected shift valve is operated under the control of an associated solenoid valve in accordance with vehicular running conditions such as vehicle speed and throttle position, whereby the hydraulic pressure is supplied to an associated hydraulic servomotor. The hydraulic servomotor then controls frictional engagement elements of the corresponding clutch or brake of the transmission to engage or release, thereby permitting automatic selection of a gear ratio.

In the transmission constructed as described above, the engagement or non-engagement of a second coast brake and a first and reverse brake varies depending on whether the manual valve is moved to a drive ("D") position or to a second ("S") or low ("L") position even when an automatically pre-established first or second speed is chosen. At the "L" position, engine braking is effected when running at either the first or second speeds. At the "S" position, however, no engine braking is effected in first speed but engine braking is effected in the second and third speeds. At the "D" position, on the other hand, no engine braking is applied in the first or second speeds but is applied when running in the third and fourth speeds.

With a view toward meeting the recent trend toward better responsiveness and feeling of control, positively reflecting the driver's desire or intention with respect to running performance and hence to enhance the fun of driving, research has been directed to an automatic transmission which provides the driver with the feeling of driver control associated with a manual gear shift vehicle. One example of such a proposed automatic transmission would have a gear shift "I" pattern and an "H" pattern combined side-by-side. Another example has a manual gear shift pattern provided in parallel with an "I" pattern so as to permit shift-up or shift-down by tilting the shift lever forward or rearward as in the "TIPTRONIC" of Porsche AG. Another example of such an automatic transmission has been previously proposed by the present assignee in which a manual valve is mechanically changed over following movement of a shift lever along a combined "I" and "H" pattern.

The former two examples are, however, designed to perform manual shifting only by utilizing an electrical signal in the "D" range of a conventional automatic transmission so that no engine braking can be effected in first speed in a manual mode. In the latter example, on the other hand, a manual valve in a hydraulic control system is operated to switch the range pressure among the "D", "S" and "L" range pressures even upon manual shifting, thereby bringing about the advantages that engine braking can be effectively applied in the first and second speeds and, at the same time, application of excessive engine braking during high-speed running can be avoided. However, the latter example also presents the problem that, because the manual valve is changed over along the "H" pattern, a complex mechanism for converting motion of the shift lever along the "H" pattern to the linear motion of the manual valve is required, resulting in the need for greater effort to operate the shift lever. Accordingly, the operational feeling, i.e. the feeling of precision of shift lever movement, is not fully satisfactory.

SUMMARY OF THE INVENTION

With the foregoing in view, the present invention has as its object provision of a hydraulic control system for a vehicular automatic transmission provided with means for effectively applying hydraulic pressure to an engine brake servomotor only in a manual shifting mode so that engine braking can be effectively applied in the manual shifting mode without the need for a change-over of hydraulic pressure by a manual valve.

Accordingly, the present invention provides a hydraulic control system for a vehicular automatic transmission which includes: a source of hydraulic pressure; a first servomotor actuated by hydraulic pressure from the hydraulic pressure source to engage or release frictional engagement elements, i.e. brakes and clutches, of the transmission; and a second servomotor, also actuated by the hydraulic pressure from the hydraulic pressure source, to apply engine braking. A manual valve and a shift valve are connected between the hydraulic pressure source and the first and second servomotors to control the hydraulic pressure. A cut-off valve is interposed in a line extending between the manual valve and said shift valve and a solenoid valve is provided for controlling the cut-off valve. An electronic controller receives as inputs vehicular running conditions and a gear-shift mode and outputs solenoid signals to control the shift valve and said cut-off valve. The electronic controller outputs a solenoid signal to the cut-off valve to control communication between the manual valve and the shift valve.

In the hydraulic control system of this invention constructed as described above, a solenoid signal is outputted in the manual shifting mode to actuate the cut-off valve so that hydraulic pressure is supplied to the second, i.e. engine brake, servomotor. It is therefore possible to selectively apply engine braking which conforms to the speed, at each shift position, without moving the manual valve, i.e. the manual valve maintained at the same position. By this system no changeover of the manual valve is required for effective exhibition of engine braking upon changeover from automatic shifting to manual shifting.

With the hydraulic control system, a manual shift is effected by a solenoid signal only, without the need for a changeover of the manual valve, thereby making it possible to provide an automatic transmission which permits manual shifting with an excellent quality of operational feeling, including a feeling of precision of shift lever movement, without the need for the adoption of a complex manual valve operation mechanism for manual shifting.

BRIEF DESCRIPTION OF THE DRAWING

The above and other objects, features and advantages of the present invention will become apparent from the following description and the appended claims, taken in conjunction with the accompanying drawings, in which:

FIG. 3 is a table summarizing operations of the various elements of an automatic transmission equipped with the hydraulic control system of FIG. 1;

DESCRIPTION OF THE PREFERRED EMBODIMENTS

Figure 1:
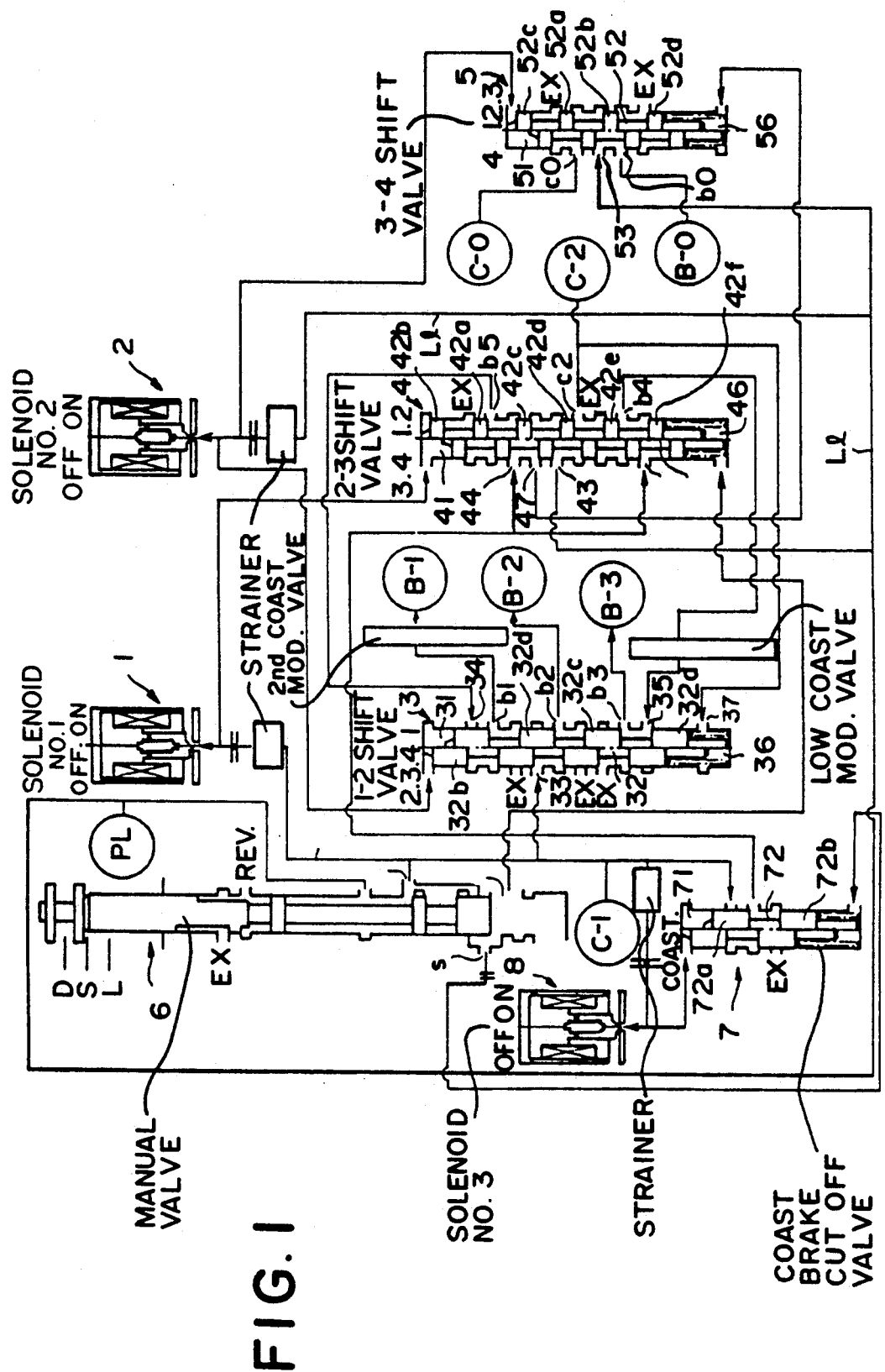
FIG. 1 is a fragmentary circuit diagram of a hydraulic control system according to one embodiment of the present invention.

Referring to the accompanying drawings, one embodiment of the present invention will hereinafter be described. FIG. 1 is a hydraulic circuit diagram showing only those components relevant to the novel features of the embodiment of a hydraulic control system according to the present invention. The hydraulic control system of this embodiment is for a 4-forward-speed transmission, and includes two shifting solenoid valves 1,2 actuated by solenoid signals from an electronic controller (not shown) and three shift valves controlled by the solenoid valves, namely, a 1-2 shift valve 3, a 2-3 shift valve 4 and a 3-4 shift valve 5.

The solenoid valve 1 controls the 2-3 shift valve 4, and is disposed at a point downstream of an orifice in a line extending from a port d of a manual valve 6 to a solenoid pressure receiving compartment 41 of the 2-3 shift valve 4 via a strainer and the orifice. The solenoid valve 2 controls the 1-2 shift valve 3 and the 3-4 shift valve 5. In the illustrated embodiment, the solenoid valve 2 is arranged at a point downstream of an orifice in a line extending from a line L1, which is maintained at line pressure by connection to hydraulic pressure source PL which generates the line pressure, to a solenoid pressure receiving compartment 31 of the 1-2 shift valve 3, via a strainer and the orifice, and also to a solenoid pressure receiving compartment 51 of the 3-4 shift valve 5.

The 1-2 shift valve 3 changes and controls the supply/drain of hydraulic pressure to/from servomotors B-1 to B-3—by which the below-described brakes B1 to B3 (see FIG. 2) are engaged or released, respectively—by displacement of a spool 32. The 1-2 2 shift valve 3 is provided with four lands 32a–32d on spool 32, three input ports 33–35, three input/output ports b1–b3 and three drain ports EX. The above-described solenoid pressure receiving compartment 31 is located in the valve body at one end of the spool 32, while a spring compartment 36 containing a spring therein to bias the spool 32 toward the solenoid pressure receiving compartment 31, is disposed in the valve body at the opposite end of the spool 32. The spring compartment 36 is provided with a port 37 for the introduction of a signal pressure from a line which extends from the 2-3 shift valve 4 to a servomotor Ce-2. The input port 33 of the 1-2 shift valve 3 is connected to a drive ("D") range pressure line Ld which, in turn, communicates with the port d of the manual valve 6. The input/output port b1 is connected to the servomotor B-1 via a second coast modulator valve, and the input/output ports b2,b3 are connected directly to the servomotors B-2,B-3, respectively.

The 2-3 shift valve 4, by displacement of a spool 42, changes and controls the supply/draining of hydraulic pressure to/from the servomotor C-2—by which a below-described clutch C2 (see FIG. 2) is engaged or released—as well as the supply of hydraulic pressure to the 1-2 shift valve 3. The 2-3 shift valve 4 is provided with six lands 42a–42f on the spool 42, three input ports 43–45, three input/output ports c2,b4,b5 and two drain ports EX. The above-described solenoid pressure receiving compartment 41 is located in the valve body at one end of the spool 42, while a spring compartment 46, containing a spring therein to bias the spool 42 toward the solenoid pressure receiving compartment 41, is disposed in the valve body at the opposite end of the spool 42. The 2-3 shift valve is also provided with a signal output port 47, which is connected to the spring compartment 56 of the 3-4 shift valve 5 described below.

As in the conventional systems, the input port 43 of the 2-3 shift valve 4 is connected to line pressure (in line L1), the input/output port c2 leading to the servomotor C-2, the output port b4 to the input port 35 of the 1-2 shift valve 3 via a low coast modulator valve, and the output port b5 to the input port 34. However, at variance with the conventional systems, the input port 44 and input port 45 are connected to the drive ("D") range hydraulic pressure line Ld via a coast brake cut-off valve 7 to be described subsequently.

The 3-4 shift valve 5, by displacement of a spool 52, changes and controls the supply/draining of hydraulic pressure to/from a servomotor C-0—by which a below-described clutch C0 (see FIG. 2) is engaged or released—as well as the supply/draining of hydraulic pressure to/from a servomotor B-0 by which a brake B0 is engaged or released. The 3-4 shift valve 5 is provided with lands 52a–52d on spool 52, an input port 53, two input/output ports c0,b0 and a drain port EX. The solenoid pressure receiving compartment 51 is located in the valve body at one end of the spool 51, while the spring compartment 56, containing a spring serving to bias the spool 52 toward the solenoid pressure receiving compartment 51, is located in the valve body at the opposite end of the spool 42. A single line connects the spring compartment 56 with the signal output port 47 of the 2-3 shift valve 4. The input port 53 of the 3-4 shift valve 5 is connected to line L1 (at line pressure), to the input/output port c0 to the servomotor c-0, and to the input/output port b0 to the servomotor B-0.

The hydraulic circuit additionally includes the coast brake cut-off valve 7 and a solenoid valve 8 for controlling the coast brake cut-off valve 7. The coast brake cut-off valve 7 is interposed in the drive ("D") range hydraulic pressure line Ld extending to the input ports 44,45 of the 2-3 shift valve 4. A spool 72 of the valve 7 has lands 72a,72b. The land 72a opens or closes an input port communicating with the drive ("D") range hydraulic pressure line Ld while the land 72b opens or closes a drain port EX. The solenoid valve 8 is arranged at a point downstream of an orifice in the drive ("D") range hydraulic oil pressure line Ld which is connected to a solenoid pressure receiving compartment 71 of the coast brake cut-off valve 7 via a stainer and the orifice. Coast brake cut-off valve 7 and solenoid valve 8 have been added to provide operation in the below-described manual shifting mode so that the drive ("D") range pressure can be supplied to the input port 44 and input port 45 of the 2-3 shift valve 4. With this arrangement, the first and reverse brake B3 provides engine braking in the first speed of the manual shifting mode, while the second coast brake B1 is actuated at second speed in the manual shifting mode. Accordingly, the servomotors B-3,B-1 which actuate these brakes constitute engine brake servomotors in this embodiment. The drive ("D") range hydraulic pressure line Ld is directly connected to the servomotor C-1 for forward clutch C1 as in the conventional systems.

Figure 2:
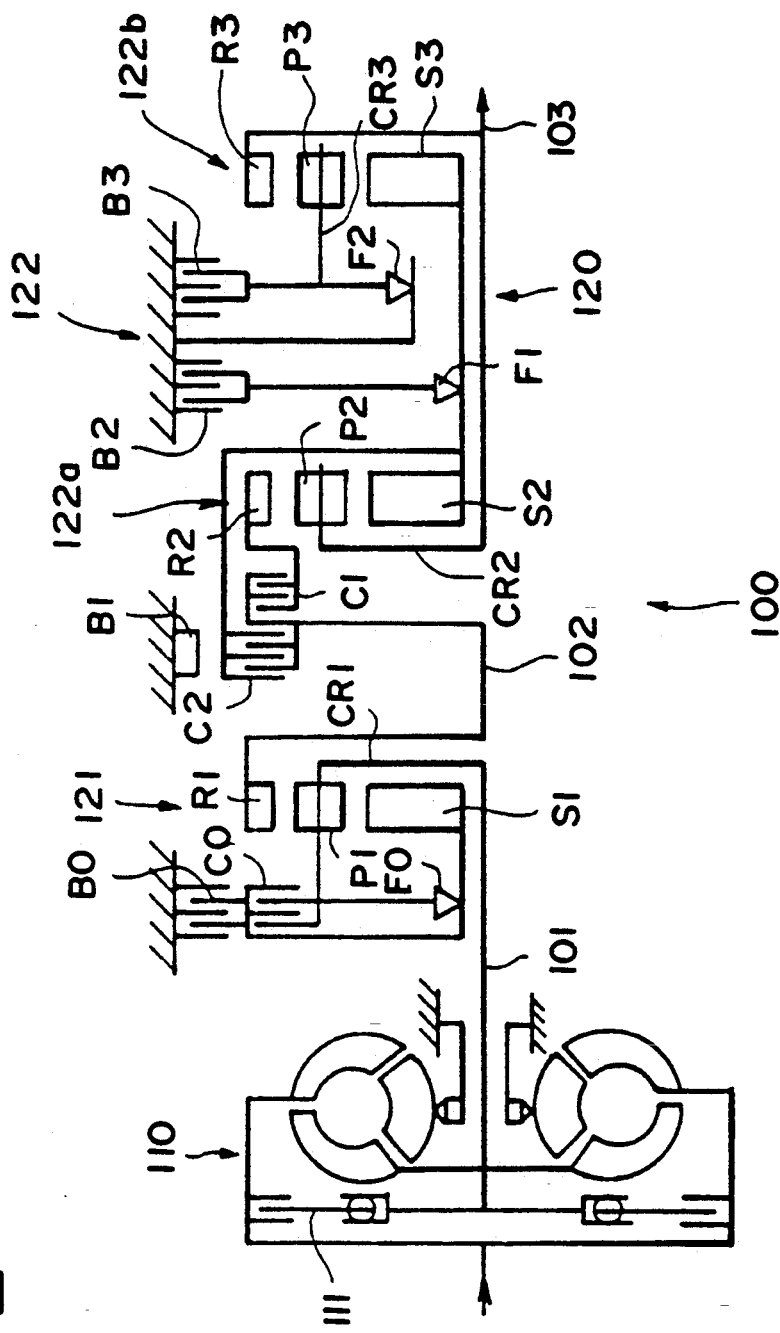
FIG. 2 is a skeletal diagram of one example of a gear train in an automatic transmission controlled by the hydraulic control system of FIG. 1.

FIG. 2 illustrates, one example of a gear train controlled by the above-described hydraulic control system. A transmission 100 is provided with a torque converter 110, which has a lock-up clutch 111, and a planetary shift gear mechanism 120. The planetary shift gear mechanism 120 includes an overdrive planetary gear unit 121 and a main shift unit 122. The main shift unit 122, in turn, includes a front planetary gear unit 22a and a rear planetary gear unit 122b.

The overdrive planetary gear unit 121 is connected to an input shaft 101, and includes a carrier CR1, a sun gear S1 and a ring gear R1. The carrier CR1 supports a planetary pinion P1 mounted thereon, the sun gear S1 is fitted on the input shaft 101, and the ring gear R1 is connected to an input shaft 102 of the main shift unit 122. Interposed between the carrier CR1 and the sun gear S1 are an overdrive direct clutch C0 and a one-way clutch F0. An overdrive brake B0 is disposed between the sun gear S1 and the transmission casing.

The front planetary gear unit 122a of the main shift unit 122 is constructed of a carrier CR2, a sun gear S2 and a ring gear R2. The carrier CR2 is connected to an output shaft 103 and supports a planetary pinion P2 mounted thereon. The sun gear S2 is arranged concentrically around the output shaft 103 and is formed integrally with sun gear S3 of the rear planetary gear unit 122b. The ring gear R2 is connected to the input shaft 102 via the forward clutch C1. A direct clutch C2 is interposed between the input shaft 102 and the sun gear S2. A second coast brake B1 in the form of a band brake is disposed between the sun gear S2 and the transmission casing, and a second brake B2 in the form of a multiple brake is arranged between the sun gear S2 and the transmission casing with a one-way clutch F1 interposed between the sun gear S2 and the transmission casing with a one-way clutch F1 interposed between the sun gear S2 and the second brake B2. The rear planetary gear unit 122b is constructed of a carrier CR3, which supports a planetary pinion P3 mounted thereon, and a ring gear R3 connected to the carrier CR2 and the output shaft 103. Between the carrier CR3 and the transmission casing, the first and reverse brake B3 and a one-way clutch F2 are arranged in parallel with each other.

FIG. 3 illustrates operation of the hydraulic control system constructed as described above. The respective clutches and brakes are either connected/engaged (shown by "O" in the table) or released (indicated by "X" in the table) in accordance with "ON" (shown by "O" in the table) or "OFF" (indicated by "X" in the table) of the corresponding solenoids No. 1 to No. 3 at the "D" position of the manual valve.

Referring next to FIGS. 1–3, the operation of the hydraulic control system will be described. In FIG. 1, one, two or three numbers are written above each shift valve on each side of a central axis of the shift valve, which numbers indicate the positions of the associated spool in the respective speed ranges. Taking the 1-2 shift valve 3 by way of example, the numbers indicate that the spool 32 assumes the lower position at the first speed but the higher position at speeds 2–4, as viewed in first the drawing. Although not shown in the operation table, at the neutral "N" position, the port d of the manual valve 6 is in communication with the port EX and is hence drained and only solenoid No. 1 is energized. Therefore, at this time, the circuit receives only the line pressure and no drive "D" range pressure is applied thereto. In this state, the spool 32 of the 1-2 shift valve 3 is in the lower position due to the line pressure received at the solenoid pressure receiving compartment 31, the spool 42 of the 2-3 shift valve 4 has been lifted by spring force and is in the raised position, and the spool 52 of the 3-4 shift valve 5 is held in the raised position by spring force because, although line pressure is present in the solenoid pressure receiving compartment 51, the same line pressure has also been applied simultaneously to the spring compartment 56 through the ports 43,47 of the 2-3 shift valve 4. The line pressure is therefore supplied only to the servomotor C-0 via the ports 53,c0 of the 3-4 shift valve 5. Describing this state with reference to the gear train in FIG. 2, the carrier CR1 and sun gear S1 of the overdrive planetary gear unit 121 are directly connected so that the ring gear R1 is also directly connected. As a consequence, the entire overdrive planetary gear unit 121 rotates as an integral unit.

When the manual valve 6 is shifted to the drive "D" position from the above state, the port d is brought into communication with the line hydraulic pressure line L1 so that the drive "D" range pressure is applied to the hydraulic control circuit. Accordingly, the drive "D" range pressure is received by the servomotor C-1. This corresponds to the 1st position in the automatic shifting mode in FIG. 3. At this time, in the gear train shown in FIG. 2, rotation is input to the ring gear R2 of the front planetary gear unit 122a through engagement of the forward clutch C1. The rotation of the ring gear R2 is then transmitted to the output shaft 103 via the carrier CR2 and, at the same time, is also transmitted to the carrier CR3 via the sun gear S2, sun gear S3 and planetary pinion P3 so that the carrier CR3 is set to be reversed. The reversal of the carrier CR3 is however prevented by the action of the one-way clutch F2 so that rotation of the ring gear R3, corresponding to the revolution of the planetary pinion P3, is transmitted to the output shaft 103.

When the solenoid No. 2 is energized, shift to the second speed is effected by draining the line pressure from the solenoid pressure receiving compartment 31,51. As a result, the spool 31 of the 1-2 shift valve 3 is displaced to the raised position but, because the line pressure is applied to the spring compartment 56 of the 3-4 shift valve 5 as described above, the spool 51 of the 3-4 shift valve 5 does not move. By the displacement of the spool 31 of the 1-2 shift valve 3, the port b2 comes into communication with the port 33 so that the drive "D" range pressure is supplied to the servomotor B-2. At this time, the second brake B2 is newly brought into engagement in the gear train shown in FIG. 2. As a result, reactive rotation of both the sun gears S2,S3 is prevented by the one-way clutch F1 so that rotation derived from revolution of the planetary pinion P2 is output to the output shaft 103 via the carrier CR2.

Shift to the third speed is effected by de-energizing the solenoid No. 1. Since the drive "D" range pressure is applied to the solenoid pressure receiving compartment 41 at this time, the spool 42 of the 2-3 shift valve 4 is downwardly displaced so that the port 43 communicates with the port c2 and the port 47 communicates to the port 44. As a result, the spring compartment 56 of the 3-4 shift valve 5 is drained via the coast brake cut-off valve 7. By these operations, the line pressure is supplied to the servomotor C-2 from the port c2. Because, at this time, the ring gear R2 and sun gears S2,S3 are directly connected in the gear train of FIG. 2, the planetary pinion P2 is also directly connected so that the front planetary gear unit 122a integrally rotates as a whole and the input shaft 101, input shaft 102 and output shaft 103 rotate at the same speed.

Shift to the fourth speed is effected by de-energizing solenoid No. 2. Since the application of the line pressure to the spring compartment 56 of the 3-4 shift valve 5 has been stopped prior to start shifting, application of the line pressure to the solenoid pressure receiving compartment 51 causes the spool 52 to be downwardly displaced against the spring force. By these operations, the port 53 is brought into communication with the port b0 and, at the same time, the port c0 is brought into communication with the port EX, whereby the line pressure is drained. As a result the clutch C0 is released and the brake B0 is engaged. As the sun gear S1 is fixed in the gear train of FIG. 2 at this time, input to the carrier CR1 is increased by self-rotation of the pinion gear P1 and is transmitted to the ring gear R1. Accordingly, increased rotation is output to the input shaft 102.

Upon downshifting, on the other hand, the hydraulic shift control system operates in a manner reverse to the operation described above. In the gear train shown in FIG. 2, a shift from the fourth speed to the third speed connects the overdrive direct clutch C0 and releases the overdrive brake B0, a shift from the third speed to the second speed releases the overdrive direct clutch C2, and a shift from the second speed to the first speed releases the second brake B2.

In the manual shifting mode, on the other hand, solenoid No. 3 is always maintained "ON" as shown in FIG. 3. By a releasing action of the solenoid valve 8, the pressure applied to the pressure receiving compartment 71 of the coast brake cut-off valve 7 is drained so that its spool 72 assumes the coast position illustrated by the left half part of the spool 72 in FIG. 1. Therefore, in the manual shifting mode, the drive "D" range pressure is always supplied to both the ports 44,45 of the 2-3 shift valve 4 via the coast brake cut-off valve 7. When the 2-3 shift valve 4 assumes the first or second speed position, the port 44 communicates with the port b5 and the port 45 communicates with the port b4. As a result, the drive "D" range pressure which has passed through the 2-3 shift valve 4 is supplied directly to the port 34 of the 1-2 shift valve 3 and is also supplied to the port 35 via a low coast modulator valve.

The drive "D" range pressure is supplied to the 1-2 shift valve 3 as described above is, in second speed, supplied from the port b1 to the servomotor B-1 via the second coast modulator valve. As a result the second coast brake B1 is brought into engagement in addition to engagement of the forward clutch C1, overdrive direct clutch C0 and second brake B2, so that the sun gears S2,S3 of the main shift unit 122 are located to provide engine braking.

In first speed, on the other hand, the drive "D" range pressure is supplied from the port b to the servomotor B-2. As a result, the first and reverse brake B3 is brought into engagement, in addition to engagement of forward clutch C1 and overdrive direct clutch C0, so that the carrier CR3 of the rear planetary gear unit 122b is locked for engine braking.

Figure 4:
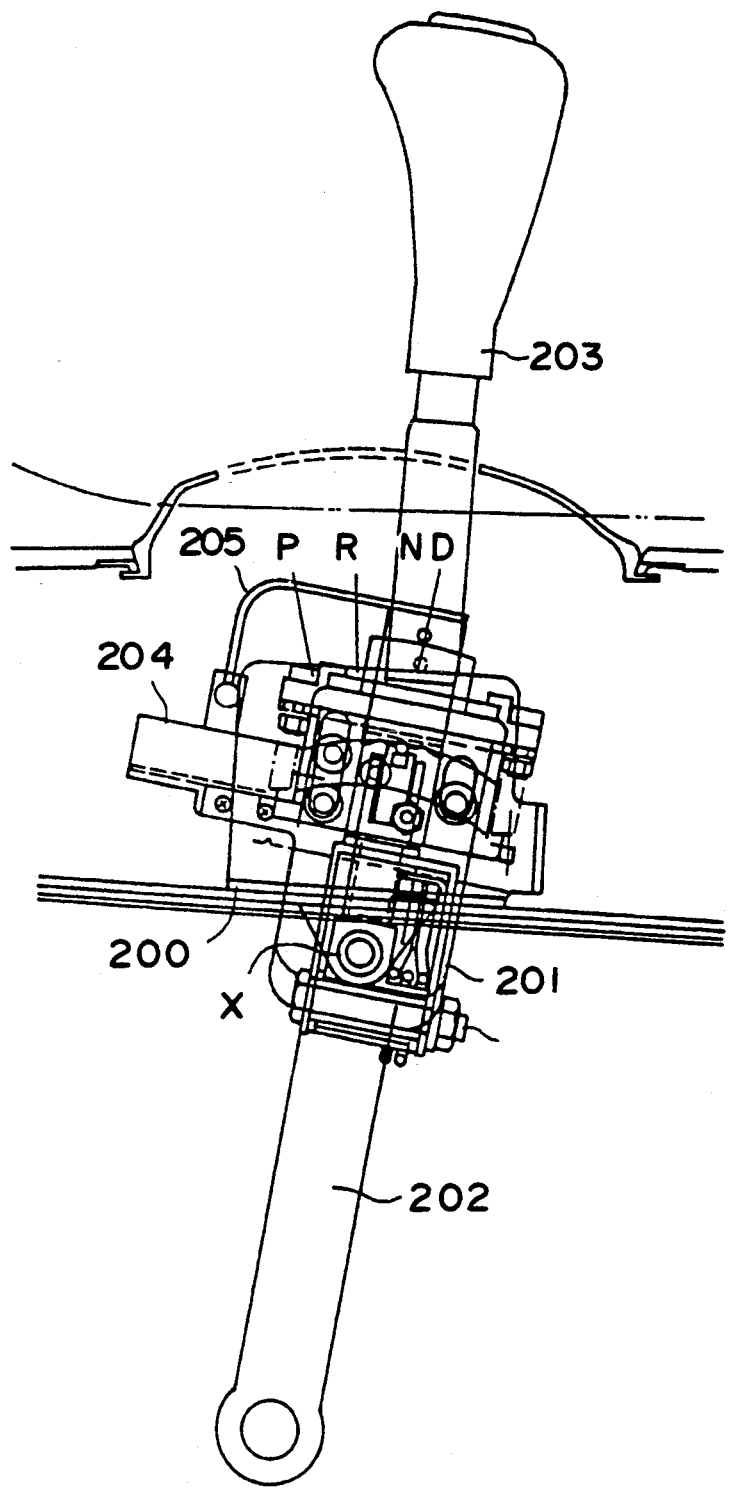
FIG. 4 is a side view of a shift lever mechanism suitable for use in connection with the hydraulic control system of FIG. 1.
Figure 5:
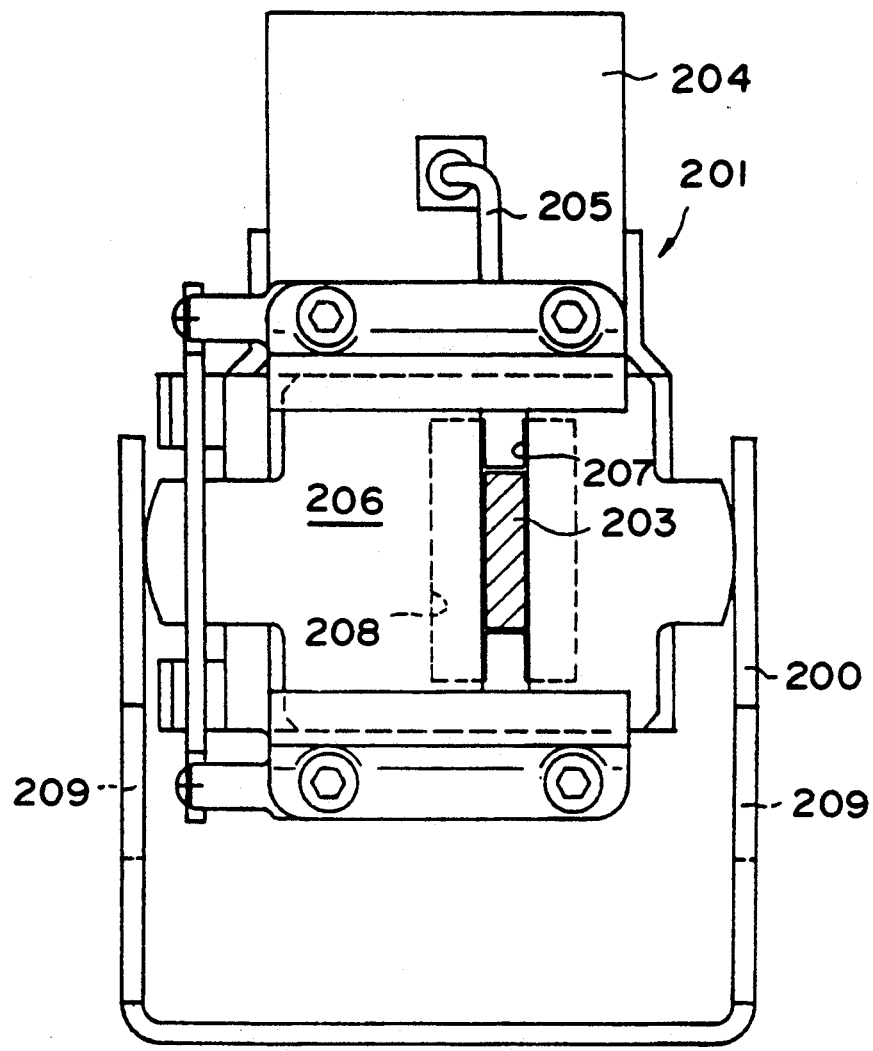
FIG. 5 is plan view of the shift lever mechanism of FIG. 4.

Various shift lever mechanisms can be used with the abovedescribed hydraulic control system. One example of a suitable shift lever mechanism is disclosed in Japanese Patent Application Laid-Open No. SHO 2-311928, will be described in brief. As is illustrated in FIGS. 4 and 5, the shift lever mechanism is provided with a manual valve connecting member 202 which is supported via a rocking retainer 201 for tilting or pivoting about a lateral axis X of a frame 200 mounted on an unillustrated vehicle body. The manual valve connecting member 202 is connected to the manual valve 6 via connecting structure such as a control rod, and a shift lever 203 is supported via the rocking retainer 201 pivoting (tilting) in both longitudinal and transverse directions about the lateral axis X and longitudinal axis Y extending at a right angle relative to the lateral axis X. To allow the shift lever 203 to tile integrally with the manual valve connecting member 202 via the rocking retainer 201 to the "P", "R", "N" and "D" positions shown in FIG. 4 and, after being disconnected from the rocking retainer 201 as a result of rotation about the longitudinal axis Y at the "D" position, to independently move along a "H" gear shift pattern, a connection/disconnection mechanism enabling the above connection and disconnection is provided between the rocking retainer 201 and the shift lever 203. A switch box 204 is attached to the rocking retainer 201 for detecting any displacement of the shift lever 203 relative to the rocking retainer 201. The shift lever 203 and the switch box 204 are connected by a selector lever 205.

As is illustrated in FIG. 5, the connection/disconnection between the shift lever 203 and the rocking retainer 201 is through a lock plate 206. The lock plate 207 has a cruciform configuration and has a central I-shaped slot 207 through which the shift lever 203 extension. The lock plate 206 is slidable transversely relative to the rocking retainer 201 and is slidably supported at opposite ends thereof by the frame 200. Accordingly, when the shift lever 203 is pivoted transversely about the longitudinal axis Y, the lock plate 206 is guided by the rocking retainer 201 and, in association with the transverse pivoting of the shift lever 203, moves in a direction perpendicular to a gate slot 208. When the shift lever 203 pivots longitudinally about the transverse axis X, the lock plate 206 does not move with the shift lever 203.

When the shift lever 203 is pulled rearward from the "P" position shown in FIG. 4, the rocking retainer 201 rocks rearward together with the shift lever 203 and reaches the "D" position via the "R" and "N" positions because the shift lever 203 is longitudinally connected to the rocking retainer 201 at a central connecting portion of the H-shaped gate slot 208 of the rocking retainer 201. During this movement of the rocking retainer 201, any transverse tilt of the shift lever 203 is limited by sliding contact between both edges of the lock plate 206 and the frame 200. By this movement, the manual valve connecting member 202 longitudinally rocks about the widthwise axis X so that a control rod (not shown) connected to a lower end of the manual valve connecting member 202 is pushed forward to change over the manual valve 6. The operation described above is not particularly different from the corresponding operation of a conventional automatic transmission.

When the shift lever 203 reaches the "D" position as described above, the edges of the lock plates 206 both assume positions registered with holes 209 of the frame 200 so that the shift lever is n longer limited to transverse pivoting. To select the first speed at this stage, the shift lever 203 is tilted leftward and is then pushed forward. By this operation, the lock plate 206 is pushed by the shift lever 203 into engagement with the holes 209 of the frame 200. This limits longitudinal rooking of the rocking retainer 201, whereby the shift lever 203 alone is allowed to rock forward. By this movement, the selector lever 205 changes over the switch box 204 to output a first speed signal. On the other hand, no changeover of the manual valve 6 via the control rod takes place as the manual valve connecting member 202 is immobilized due to the restraint of the rocking retainer 201 on the frame 200.

To then select the second speed, the shift lever 203 is tilted leftward and pulled rearward. By this operation, no changeover of the manual valve 6 via the control rod takes place either. The selection of the third speed and that of the fourth speed are both performed in like manner and, in each case, a signal indicating the corresponding speed is output by the changeover of the switch box 204.

The shift signal obtained as described above is processed in a manner similar to a shift signal output in accordance with vehicle speed and throttle position in the drive "D" range in a conventional automatic transmission, and is employed for the control of a shift solenoid valve.

Figure 6:
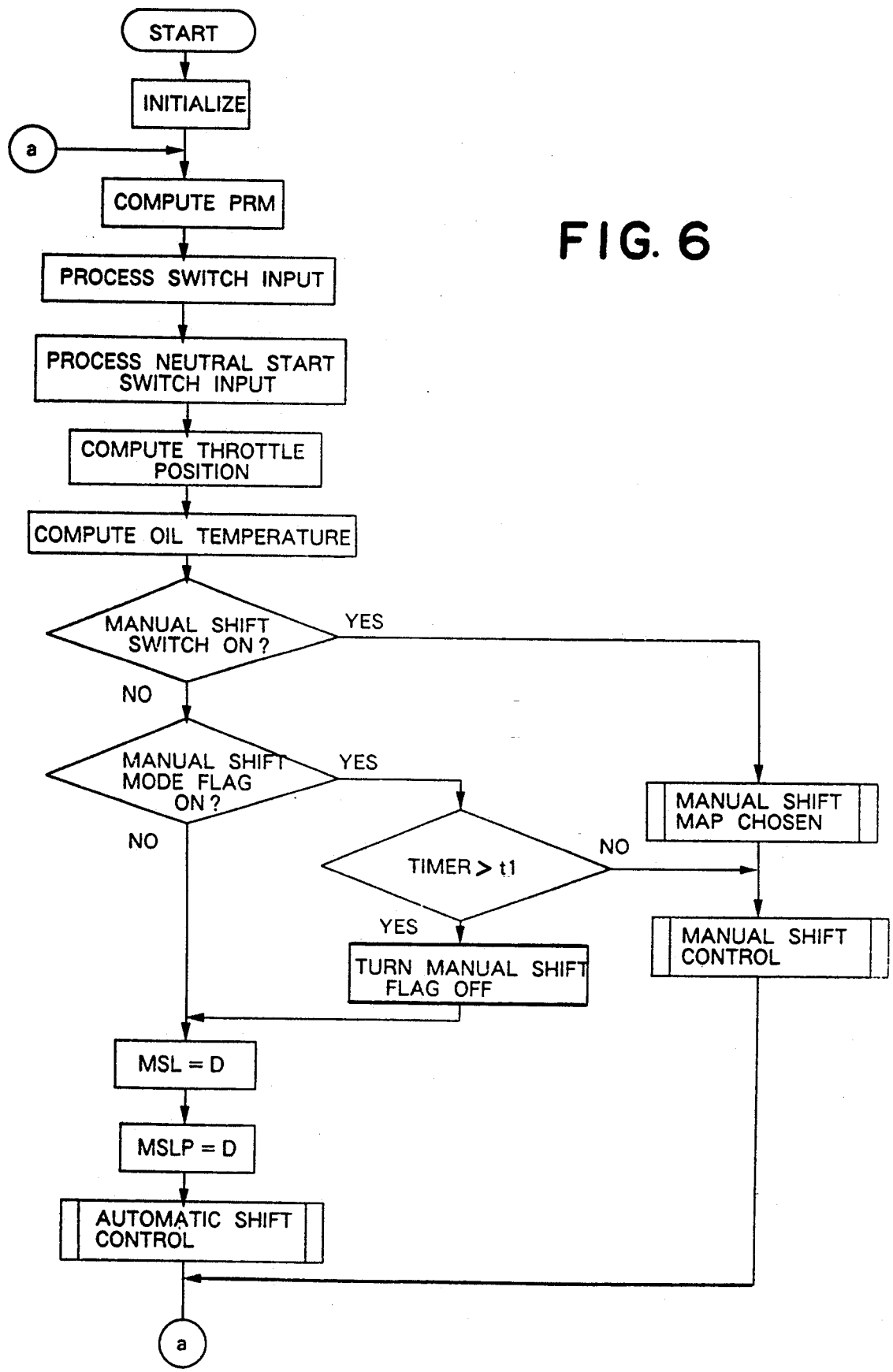
FIG. 6 is a flow chart illustrating a control routine for electronic control of the hydraulic control system of FIG. 1.

FIG. 6 illustrates control processing by an electronic controller for an automatic transmission in which such a manual transmission has been installed. After initialization, rpm computation, switch input processing, neutral start switch input processing and oil temperature computation, all of which are usually take place in a conventional automatic transmission, there are added determination of "ON" or "OFF" of a manual shift switch, namely, of the switch box 204 and determination of "ON" or "OFF" of a manual mode flag which is set responsive to a manual shift. When the manual shift switch is "ON" and the manual mode flag has not been set, the "D" range is selected in a shift diagram table and the "D" range is also selected in a lockup diagram table—control is performed in the automatic shift mode (control of the automatic transmission).

When the manual shift switch is determined to be "ON", on the other hand, a manual map is selected so that control is performed in the manual shift mode. When the manual mode flag has been set, the manual shift mode or the automatic shift mode is selected in accordance with whether a predetermined time $t_1$ has elapsed or not.

Figure 7:
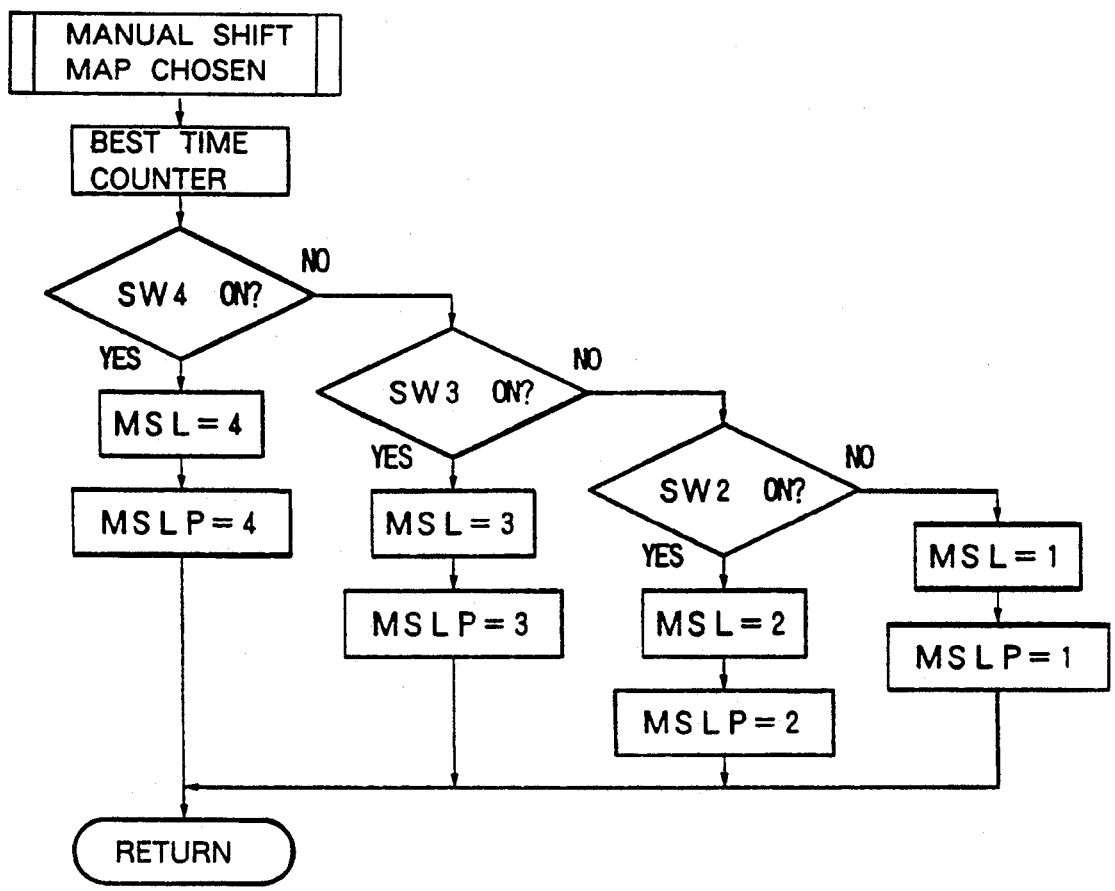
FIG. 7 is a flow chart showing a sub-routine for choosing a manual shift map.
Figure 8:
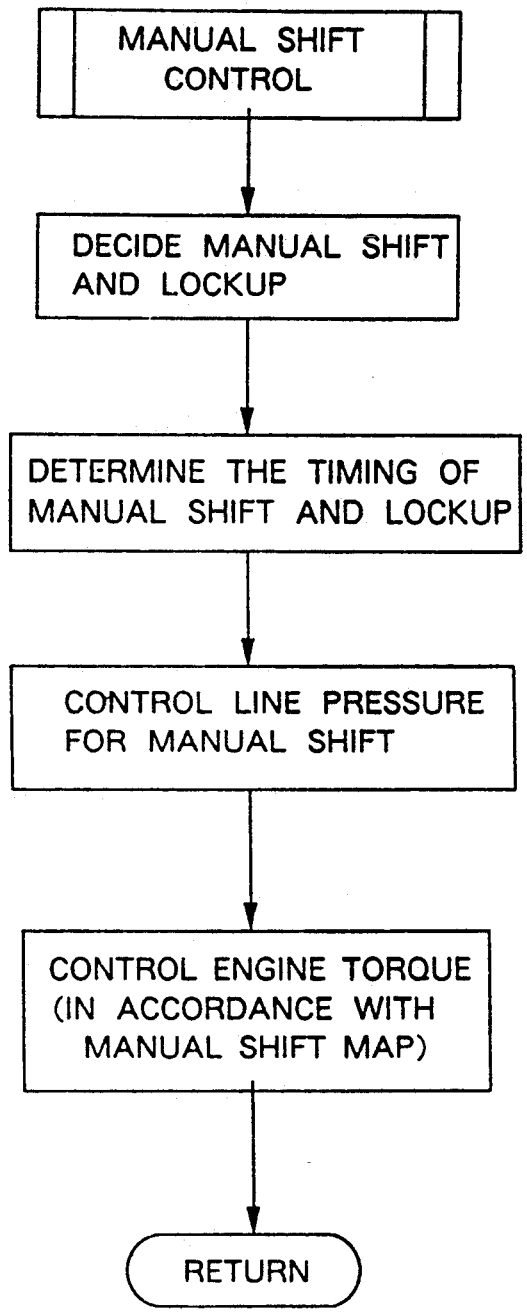
FIG. 8 is a flow chart depicting a sub-routine for the control of a manual shift.
Figure 9:
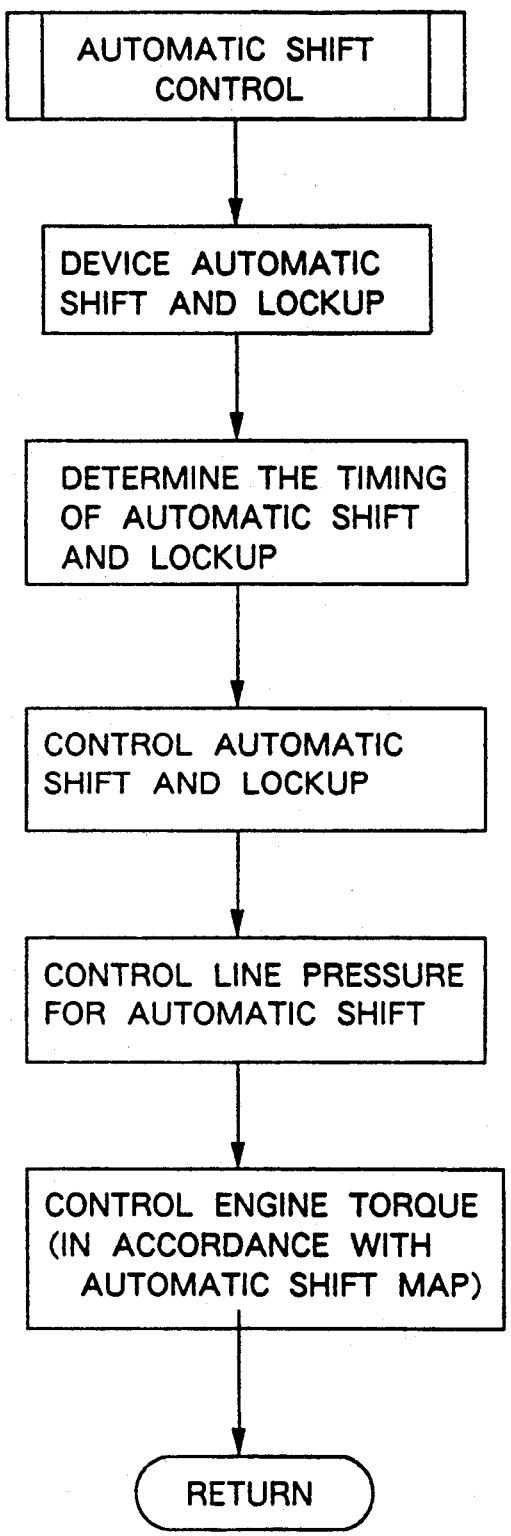
FIG. 9 is a flow chart depicting a sub-routine for the control of an automatic shift.

FIG. 7 shows a sub-routine executed when the manual shift map has been chosen. In this sub-routine, subsequent to resetting the timer counter, a shift diagram table and a lock-up diagram table are selected in accordance with the "ON" or "OFF" state of the respective manual shift switches (SW1-SW4), depending on the respective shift positions. FIGS. 8 and 9 illustrate the sub-routines for manual shift control and automatic shift control, respectively, in the above overall control scheme.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control system for a vehicular automatic transmission having a plurality of frictional engagement elements, comprising:
   a source of hydraulic pressure;
   a first servomotor, actuated by said hydraulic pressure, for selectively engaging or releasing the frictional engagement elements of the transmission;
   a second servomotor, actuated by said hydraulic pressure, for applying an engine brake;
   a manual valve and a shift valve, both connected between said hydraulic pressure source and said first and second servomotors, for controlling the supply of hydraulic pressure;
   a cut-off valve interposed in a line extending between said manual valve and said shift valve;
   a solenoid valve for controlling said cut-off valve; and
   an electronic controller for receiving as inputs vehicular running conditions and a gear-shift mode and for outputting solenoid signals to control said shift valve and said cut-off valve responsive to said inputs, thereby controlling communication between said manual valve and said shift valve through said line.

* * * * *

UNITED STATES PATENT AND TRADEMARK OFFICE
CERTIFICATE OF CORRECTION

PATENT NO. : 5,269,204
DATED : December 14, 1993
INVENTOR(S) : MOROTO et al

It is certified that error appears in the above-indentified patent and that said Letters Patent is hereby corrected as shown below:

Col. 4, line 9, "Ce-2" should read --C-2--.

Col. 5, line 32, "22a" should read --122a--.

Col. 8, line 35, "tile" should read --tilt--.

Signed and Sealed this

Sixth Day of September, 1994

Attest:

BRUCE LEHMAN

*Attesting Officer*  *Commissioner of Patents and Trademarks*